United States Patent [19]

Berryhill

[11] Patent Number: 4,711,649
[45] Date of Patent: Dec. 8, 1987

[54] AIR FILTER AND METHOD
[75] Inventor: Robert A. Berryhill, Stokesdale, N.C.
[73] Assignee: Austin-Berryhill Fabrication, Inc., Greensboro, N.C.
[21] Appl. No.: 902,492
[22] Filed: Sep. 2, 1986
[51] Int. Cl.$^4$ ............................................. B01D 46/20
[52] U.S. Cl. ............................................. 55/97; 55/352; 55/354; 55/470; 55/528
[58] Field of Search .................. 55/97, 352, 354, 351, 55/470, 528

[56] References Cited

U.S. PATENT DOCUMENTS

| | | | |
|---|---|---|---|
| 2,807,330 | 9/1957 | Rivers | 55/907 |
| 2,808,899 | 10/1957 | Hofstetter | 55/354 |
| 3,040,495 | 6/1962 | Doebeli | 55/97 |
| 3,467,797 | 9/1969 | Revell | 55/354 X |
| 3,596,442 | 8/1971 | Neumann | 55/354 |
| 3,745,748 | 7/1973 | Goldfield et al. | 55/97 |
| 3,800,509 | 4/1974 | Carr et al. | 55/352 X |
| 3,841,066 | 10/1974 | Wakeen | 55/351 X |
| 4,221,576 | 9/1980 | Phillips, Jr. | 55/352 |

FOREIGN PATENT DOCUMENTS 652004 4/1951 United Kingdom .................. 55/354

Primary Examiner—Kathleen J. Prunner

[57] ABSTRACT

An air filter and method are presented whereby contaminants such as cotton dust are reduced to an acceptable level in textile mills or the like. The air filter employs an advanceable medium which passes over a drum and the used medium is wound onto a take-up roller. The medium supply roll is protected from contaminants prior to its employment on the drum as it is covered by the used medium on its return path.

14 Claims, 3 Drawing Figures

AIR FILTER AND METHOD

BACKGROUND OF THE INVENTION

1. Field Of The Invention

This invention relates to an improved air filtration unit having a non-rotatable drum around which advances a thin textile filter medium. This device is useful in industrial plants such as textile mills where cotton dust is a major air contaminant.

2. Description Of The Prior Art And Objectives Of The Invention

Various prior art devices have been developed through the years for use in factories, textile and other mills, office buildings and other enclosed structures to remove one or more contaminants from the air which is breathed by workers. Such air filter units have their own fans for pulling air through a filter medium and for exhausting the filtered air back into the room. Conventional units generally operate at high static pressure ($1\frac{1}{4}$–$1\frac{1}{2}$ inches of $H_2O$) and require a fan having a motor rated at 2 or more horsepower to achieve the desired contaminant reduction results. Also, many prior art devices may require a 1 horsepower or a larger electric motor to advance the filter medium. Conventional filtration units may also require a hood or cover to protect the unrolled or fresh filter medium from contamination before use and enclosing the filter medium supply can cause difficulty during removing or changing the filter medium when needed.

With these problems and disadvantages known of conventional air filtration units the present invention was conceived and one of its objectives is to provide an air filter which will operate effectively at 0.8 inch of static pressure ($H_2O$) with the use of 2 centrifugal fans each having $\frac{1}{3}$ horsepower 110 volt electric motors.

It is another objective of the present invention to provide an air filter which is economical to build and which is relatively simple to maintain in operation.

It is still another objective of the present invention to provide an air filter in which maintenance personnel can easily detect any problems which may arise and can easily change the filter medium supply when necessary.

It is yet another objective of the present invention to provide an air filter having a filter medium supply, a non-rotatable drum and a take-up roller whereby the filter medium from the supply passes around the drum and back over the filter medium supply thereby protecting medium supply from contamination.

It is still yet another objective of the present invention to provide an air filter in which a small horsepower motor can be used to advance the filter medium since the filter medium supply roll provides an axis of rotation.

It is another object of the present invention to provide a method for filtering air comprising extending filter medium from a medium supply to a support drum, wrapping the support drum with medium, returning the medium from the drum along the outer periphery of the medium supply and on to a take-up roller whereby contaminated air passes through the filter medium and support drum thereby removing contaminants therein.

Various other advantages and objectives of the present invention become apparent to those skilled in the art as a more detailed description of the invention is set forth below.

SUMMARY OF THE INVENTION

The present invention relates to an apparatus and method for filtering air as is commonly encountered in industrial plants such as textile mills or the like. Air heavily laden with cotton dust presents a health hazard which must be addressed to lower said contaminants to an acceptable level. The air filter as presented herein includes a drum, a filter medium supply, and a take-up roller. The take-up roller is driven by an electric motor and advances the filter medium around a support drum whereby air passing through the face of the drum is filtered. The filter medium automatically advances around the face of the drum through control of a pressure switch which operates or is activated upon the filter medium reaching 0.8 of an inch static pressure ($H_2O$). The used filter medium passes from the drum over the medium supply (roll) where it protects the clean filter medium and the filter medium supply acts as a pulley or axis of rotation to thereby reduce the amount of force required to advance the medium around the drum.

DESCRIPTION OF THE PREFERRED EMBODIMENTS

The preferred form of the invention comprises a frame having left and right sides with a cylindrical support member or drum having a perforated face mounted therebetween. A filter medium supply or roll is likewise mounted between the left and right sides from which filter medium can be directed underneath and around the drum face, continuing on back over the medium supply and finally to a take-up roller. The take-up roller turns, which may be controlled by a pressure switch or if desired by a jog switch and the filter medium advances around the drum face and new filter medium is thereby supplied thereto. The air passing through the medium is filtered at a relatively low static pressure of 0.8 inch ($H_2O$) or less and centrifugal fans placed within the drum each have 110 volt AC low horsepower electric motors.

The preferred method comprises filtering air by extending the filter medium from the medium supply roll to the drum and returning the medium from the drum along the outer periphery of the medium supply roll and onto a take-up roller whereby air is passed through the filter medium and support drum and the contaminants contained therein are removed from the air.

DETAILED DESCRIPTION OF THE DRAWINGS AND OPERATION OF THE INVENTION

Figure 1:
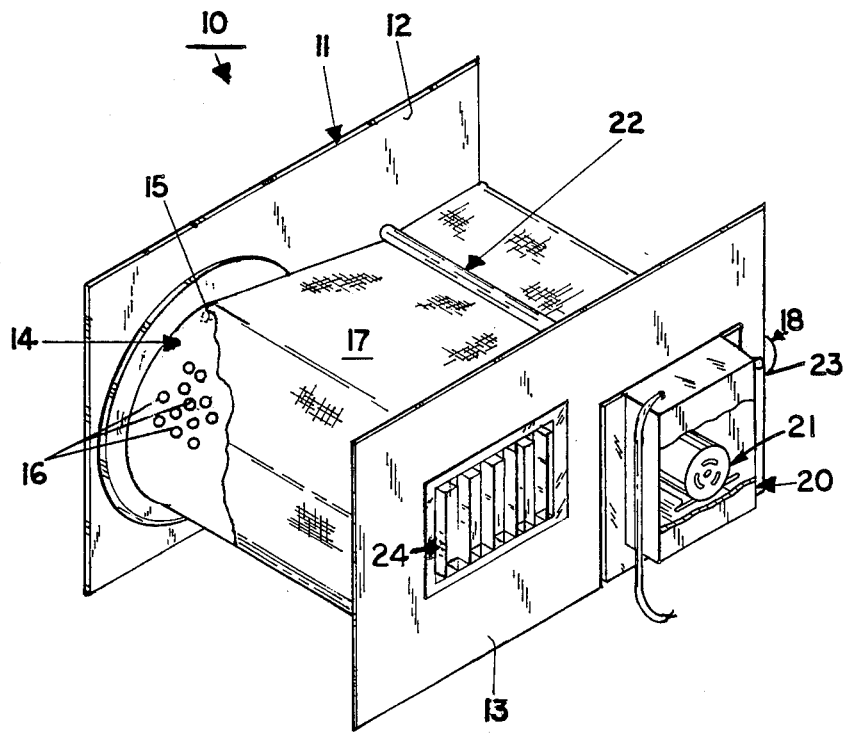
FIG. 1 is a perspective view of a typical embodiment of the invention.

Turning now to drawings, as shown in FIG. 1 air filter 10 includes frame 11 with left side member 12 and right side member 13. Mounted between side members 12 and 13 is drum 14 having a perforated face 15. As would be understood, contaminated air which may contain cotton dust or other pollutants passes through filter medium 17 on drum 14 which may be for example a conventional spun bonded nylon having a weight of approximately 0.6 ounce per sqaure yard and a thickness of approximately 1/64 of an inch. Filter medium 17 is advanced as required in a clockwise direction by a take-up roller. As the take-up roller rotates filter medium supply 18, which consists of a roll of thin filter medium, the supply rotates or unwinds to provide the necessary medium 17 to drum face 15.

Figure 2:
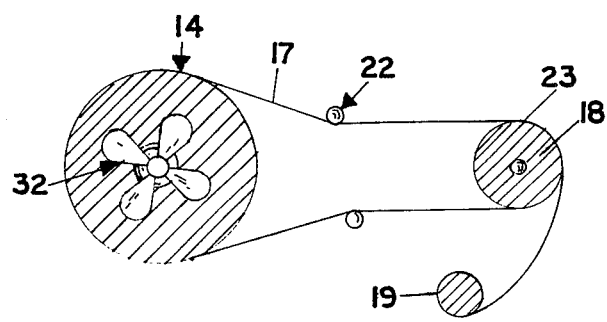
FIG. 2 demonstrates in schematic fashion the filter and filter medium path.

Air passing through filter medium 17 on drum 14 passes through perforations 16 on drum face 15 and through centrifugal fans (not shown in FIG. 1) within drum 14 and the filtered air passes out through registers 24 on each end of drum 14. Take-up roller 19 as shown in FIG. 2 is powered by medium motor 21 which is a 110 volt electric motor of 1/60 horsepower which is contained within housing 20 as seen in FIG. 1. As filter medium 17 passes over drum 14 and under cut-off switch axle 22 medium 17 continues to media supply 18 where it passes over the outer periphery 23 of supply 18. It has been determined that an electric motor of approximately ½ size can be used by passing the used medium over periphery 23 of medium supply 18 with supply 18 having a width of approximately 39 inches. That is, where approximately 200 in./lbs. of torque are required to move the medium from a stopped position on drum face 15, by directing medium 17 over periphery 23 of medium supply 18, the required torque is reduced to approximately 100 in/lbs., thereby requiring a much smaller motor to drive take-up roller 19.

Figure 3:
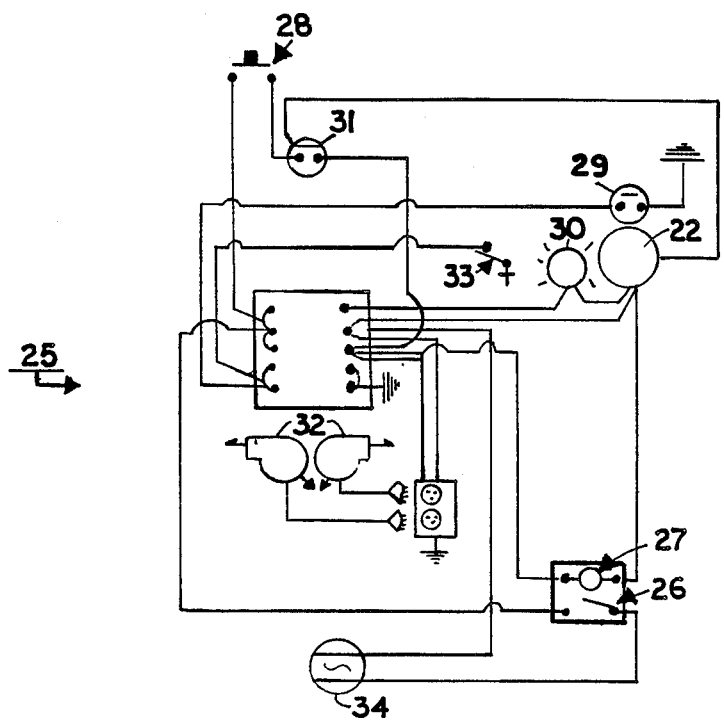
FIG. 3 demonstrates the electrical circuitry of the invention.

FIG. 3 demonstrates electrical circuitry 25 in which on/off switch 26 is connected to "power on" light 27. Electrical circuitry 25 utilizes 110 volts AC which has been found to be sufficient as medium motor 21 is only a fractional horsepower (hp) motor such as 1/60 hp and the fan motors for fans 32 are only ½ hp each. Temperature cut-off switch 29 is in juxtaposition to medium motor 21 and senses the heat generated by motor 21 in the event that medium motor 21 inadvertently runs continuously. For example, if medium motor 21 should operate for 2 minutes continuously (20 seconds being the normal run period), temperature switch 29 would cut-off medium motor 21 and trouble light 30 would be activated. Temperature switch 29 is adjustable and may be set for greater or lesser time periods for medium motor 21 runs as desired. The 110 volt AC power supply is represented at 34.

Pressure switch 31 activates medium motor 21 which drives take-up roller 19. Pressure switch 31 is adjustable and it has been found that approximately 0.8 inch of static pressure (H$_2$O) can be used as the upper limit. Thus, when the dust accumulates on filter medium 17 to provide a 0.8 inch static pressure (H$_2$O), pressure switch 31 then activates medium motor 21 to rotate take-up roller 19 thereby advancing filter medium 17 across drum face 15. Jog switch 28 is used to activate medium motor 21 to advance filter medium 17 for example during maintenance, medium replacement or repairs and prevents the necessity of rotation of take-up roller 19 by hand which may be very difficult.

Cut-out switch 33 provides an additional safety feature as shown in FIG. 3 and is of the magnetic type. Switch 33 is attached to cut-off switch axle 22. As would be understood, if there is no medium between cut-off switch axle 22 and drum face 15, cut-off switch 33 closes and medium motor 21 will not operate in an attempt to advance additional medium.

In a typical operation, such as a textile winding room, cotton yarn is wound onto cones for further processing. 400 or more micrograms of cotton dust per cubic meter may be present in the air and such high concentrations violate OSHA standards of a maximum cotton dust allowable limit of 200 micrograms per cubic meter of air. It has been determined that by the use of air filters of the present invention the micrograms of cotton dust per cubic meter, based on 15 air changes per hour can be reduced to 173 micrograms per meter and maintained at that level. This reduction is well within the OSHA tolerances of a safe working envrionment and as such the present invention provides for economical air filtration for the mill owners.

Various changes and modifications can be made to the present invention by those skilled in the art and the examples and illustrations presented herein are merely for explanatory purposes and are not intended to limit the scope of the appended claims.

I claim:

1. A filter comprising: a filter medium support drum, a filter medium supply positioned proximate said support drum, a take-up roller positioned proximate to said filter medium supply and filter medium extending from said medium supply over said support drum and back into engagement with said medium supply and thereafter onto said take-up roller.

2. A filter as claimed in claim 1 and including a medium motor, said medium motor joined to said take-up roller.

3. A filter as claimed in claim 2 and including a magnetic cut-out switch, said cut-out switch connected to said medium motor.

4. A filter as claimed in claim 1 and including a fan, said fan positioned within said drum.

5. A filter as claimed in claim 1 wherein said filter medium supply comprises a roll of said filter medium.

6. A filter as claimed in claim 1 wherein said filter medium comprises a spun nylon fiber web.

7. A filter as claimed in claim 1 and including a pair of centrifugal fans, said fans mounted within said drum.

8. A filter as claimed in claim 1 wherein said drum includes a perforated face.

9. A filter as claimed in claim 1 and including a pressure switch, said pressure switch connected to said medium motor.

10. An air filter comprising: a frame, a drum attached to said frame, a filter medium supply, said medium supply consisting of a roll of filter medium, said medium supply rotatably mounted on said frame and a take-up roller rotatably mounted to said frame and positioned to advance said filter medium from said filter medium supply over said drum, into engagement with said medium supply and thereafter to said take-up roller.

11. A method of filtering air comprising: extending filter medium from a medium supply to a support drum, wrapping the support drum with the medium, returning the medium from the drum across the outer periphery of the medium supply and on to a take-up roller, and passing air through the filter medium and support drum to remove contaminants from the air.

12. A method of filtering air as claimed in claim 11 and including the step of rotating the take-up roller to advance the filter medium around the drum.

13. A method of filtering air as claimed in claim 11 and including the step of closing a pressure switch to rotate said take-up roller.

14. A method of filtering air as claimed in claim 11 and including the step of directing the air from within the support drum with centrifugal fans.

* * * * *